US012127992B1

(12) United States Patent
Luo

(10) Patent No.: US 12,127,992 B1
(45) Date of Patent: Oct. 29, 2024

(54) MASSAGER WITH NON-CONTACT DRIVING APPARATUS

(71) Applicant: Dongguan Renchun Electronics Co., Ltd., Dongguan (CN)

(72) Inventor: Chenggui Luo, Dongguan (CN)

(73) Assignee: Dongguan Renchun Electronics Co., Ltd., Dongguan (CN)

( * ) Notice: Subject to any disclaimer, the term of this patent is extended or adjusted under 35 U.S.C. 154(b) by 0 days.

(21) Appl. No.: 18/421,089

(22) Filed: Jan. 24, 2024

(51) Int. Cl.
*A61H 19/00* (2006.01)
*A61H 23/04* (2006.01)

(52) U.S. Cl.
CPC ............. *A61H 19/34* (2013.01); *A61H 23/04* (2013.01)

(58) Field of Classification Search
CPC ...................................................... A61H 9/007
See application file for complete search history.

(56) References Cited

U.S. PATENT DOCUMENTS 1,914,290 A * 6/1933 Popkin ................... A61H 9/005 601/6
11,090,194 B2 * 8/2021 George ................... A61F 11/08
11,389,374 B1 7/2022 He
2021/0205167 A1 * 7/2021 Haddock Dicarlo .... A61H 1/00
2022/0175612 A1 * 6/2022 Witt ........................ A61H 19/30
2022/0211569 A1 * 7/2022 Lenke ..................... A61H 19/34
2022/0313537 A1 * 10/2022 Shadduck ........... A61M 35/003
2023/0023890 A1 * 1/2023 Haddock Dicarlo ........................ A61H 9/0007
2023/0172793 A1 * 6/2023 Witt ..................... A61H 9/0057 600/38
2023/0390144 A1 * 12/2023 He ....................... A61H 9/0007

FOREIGN PATENT DOCUMENTS

CN 109730918 A 5/2019

* cited by examiner

*Primary Examiner* — LaToya M Louis
(74) *Attorney, Agent, or Firm* — Westbridge IP LLC

(57) ABSTRACT

A massager with a non-contact driving apparatus includes a machine housing, a driving apparatus, and a positioning seat. The driving apparatus is arranged in the machine housing. The driving apparatus includes a rotating motor, a driving seat, a screw guide seat, and an expansion seat. The screw guide seat is provided with a guide groove, an upper end wall of the screw guide seat is provided with a sealing ring, and the positioning seat is provided with a soft piece. The expansion seat moves back and forth in a closed cavity and conveys positive and negative pressure fluid, thereby the soft piece is forced to swing back and forth. By improving the structure of the driving apparatus, a linear change of the fluid is achieved, and movement intermittency caused by an existing cam mechanism is avoided, so that the movement of the soft piece is softer.

10 Claims, 7 Drawing Sheets

MASSAGER WITH NON-CONTACT DRIVING APPARATUS

TECHNICAL FIELD

The present application relates to the field of massage apparatuses, in particular to a massager with a non-contact driving apparatus.

BACKGROUND

With the development of living, people's demands or design requirements for massage apparatuses are higher and higher, herein the setting of touch and working frequency is included.

However, the existing massage apparatuses, such as United States patent U.S. Pat. No. 11,389,374B1, use a combination of a driving assembly and an expansion assembly, to achieve relative movement between a soft colloid and a soft piece, thereby the massage function is achieved.

It mainly achieves displacement difference by a cam structure, thereby the relative movement is achieved. Therefore, mechanical vibration is relatively large, and its movement stroke is intermittent, the movement is not linear enough, and some also have some noise and rigid contact problems.

SUMMARY

A main purpose of the present application is to provide a massager with a non-contact driving apparatus, and aims to improve an existing driving structure. A soft piece may achieve flexible movement, and its movement stroke is linear, thus the massage function is softer. At the same time, it may achieve vibration or swing in a non-contact driving mode, and it is a scheme to replace an existing vibrating motor or cam apparatus.

In order to achieve the above purpose, the present application provides a massager with a non-contact driving apparatus, including:

- a machine housing, herein the machine housing includes a hard inner housing and a soft outer housing that wraps the hard inner housing, and the hard inner housing is provided with an accommodating chamber;
- a driving apparatus, herein the driving apparatus is arranged in the accommodating chamber, and the driving apparatus includes a rotating motor, a driving seat, a screw guide seat, and an expansion seat,
- a driving end of the rotating motor is provided with a rotating shaft extended upwards, and the driving seat is connected with the rotating shaft,
- an outer wall of the driving seat is provided with a loop-closed spiral groove, and the screw guide seat is mounted on an upper wall of the rotating motor,
- the screw guide seat is provided with a positioning cavity, the driving seat is arranged in the positioning cavity, the screw guide seat is provided with a guide groove, an upper end wall of the screw guide seat is provided with a sealing ring, an inner wall of the expansion seat is provided with a sliding guide cavity, and the sliding guide cavity is in contact with the sealing ring and enclosed as a closed cavity,
- the expansion seat is provided with a steel ball that passes through the guide groove and is partially stuck in the spiral groove, and an upper portion of the expansion seat is provided with a fluid through hole communicated with the closed cavity; and
- a positioning seat, herein the positioning seat is provided with a fluid inlet communicated with the fluid through hole, and the positioning seat is provided with a soft piece,
- the expansion seat moves back and forth in the closed cavity and conveys positive and negative pressure fluid, thereby the soft piece is forced to move or deform.

In a practical design, a technical scheme of the present application improves the structure of the driving apparatus, thereby linear variation of fluid is achieved, and movement intermittency caused by an existing cam mechanism is avoided, so that the movement of the soft piece is softer. At the same time, a non-contact driving mode is adopted to achieve non-contact driving of the soft piece, and directional vibration or directional swing may be achieved.

Firstly, the driving seat is mounted in the position of the rotating shaft, then the screw guide seat is fixed on the rotating motor, the expansion seat is mounted on the screw guide seat, and finally the steel ball is mounted on the expansion seat, the steel ball is allowed to pass through the guide groove and stuck in the spiral groove; and when the rotating motor rotates, the steel ball rotates with the spiral groove and forces the expansion seat to move vertically back and forth along a height direction of the guide groove, namely the expansion seat achieves up and down movement of the expansion seat by the loop-closed spiral groove. At the same time, by the reciprocating movement of the expansion seat in the closed cavity, the pressure change of the fluid through hole is achieved, and the air pressure change is more linear, and the stability is better.

For example, when the rotating motor rotates clockwise, the expansion seat achieves relative air intake; when the rotating motor rotates counterclockwise, the expansion seat achieves relative air supply; and thus, the positive and negative air pressure switching of the closed cavity is achieved, and the air flow is uniform and stable, the air pressure is stronger, thereby it is guaranteed that an air pump achieves the corresponding function.

DETAILED DESCRIPTION OF THE EMBODIMENTS

Figure 1:
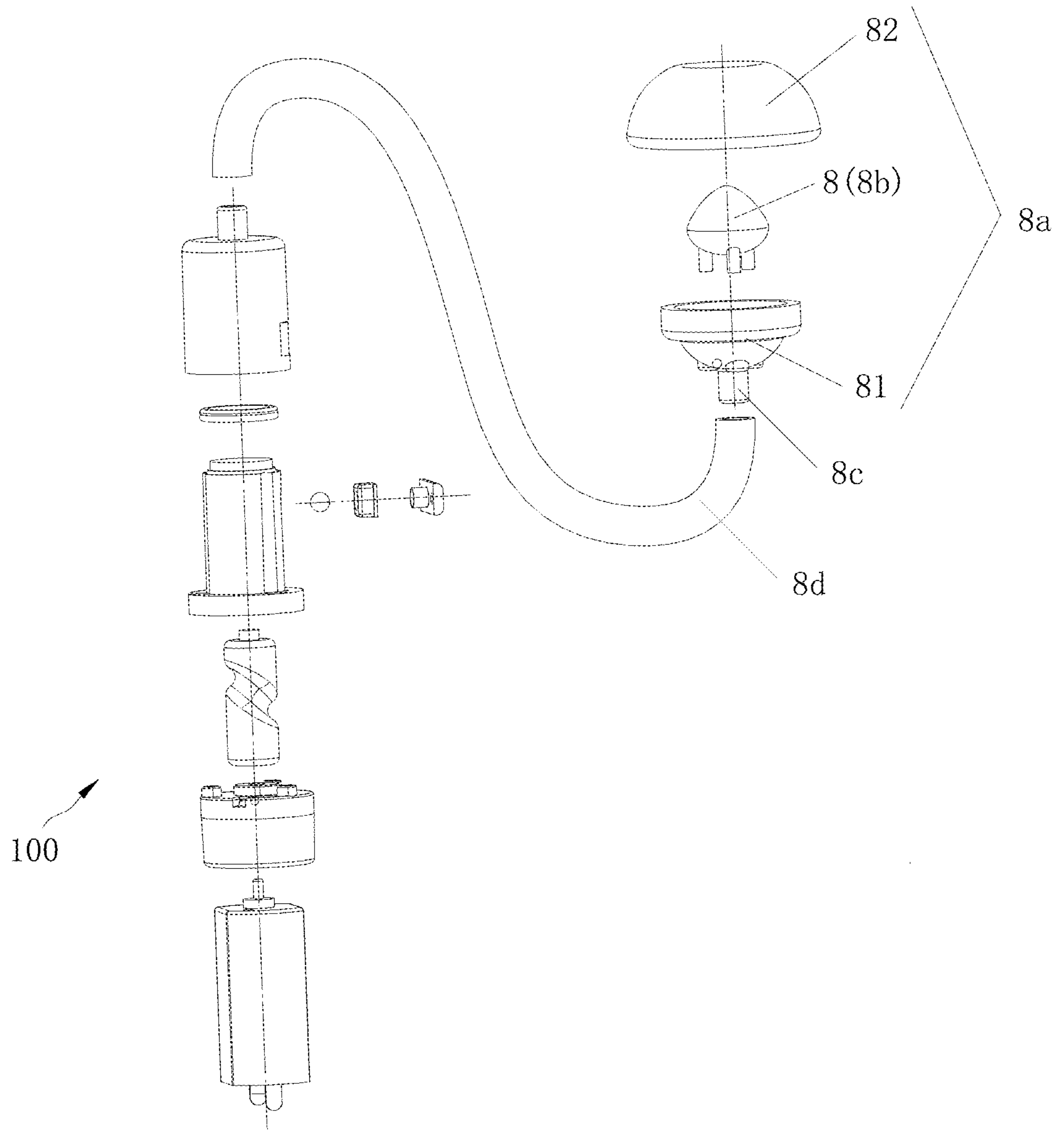
FIG. 1 is an exploded view of a first embodiment of the present application.

Technical schemes in embodiments of the present application are clearly and completely described below in combination with the drawings. Apparently, the embodiments described are only a part of the embodiments of the present application, not all of the embodiments. Based on the embodiments in the present application, all other embodiments obtained by those of ordinary skill in the art without paying creative labor shall fall within the scope of protection of the present application.

It should be noted that if a directional indication (such as up, down, left, right, front, back, top, bottom, inside, outside, vertical, horizontal, longitudinal, counterclockwise, clockwise, circumferential, radial, and axial) is involved in the embodiments of the present application, the directional indication is only used to explain a relative position relationship, a motion situation and the like between various components in a specific posture (as shown in the drawings). If the specific posture is changed, the directional indication is also changed accordingly with it.

In addition, if there is a description of "first" or "second" or the like in the embodiments of the present application, the description of "first" or "second" or the like is only for the purpose of description and may not be understood as indicating or implying its relative importance or implying the number of technical features indicated. Therefore, the features limited to the "first" and "second" may explicitly or implicitly include at least one of these features. In addition, the technical schemes between various embodiments may be combined with each other, but must be based on what those of ordinary skill in the art may achieve. When a combination of the technical schemes is contradictory or impossible to achieve, it should be considered that this combination of the technical schemes does not exist and is not within the scope of protection claimed by the present application.

Figure 2:
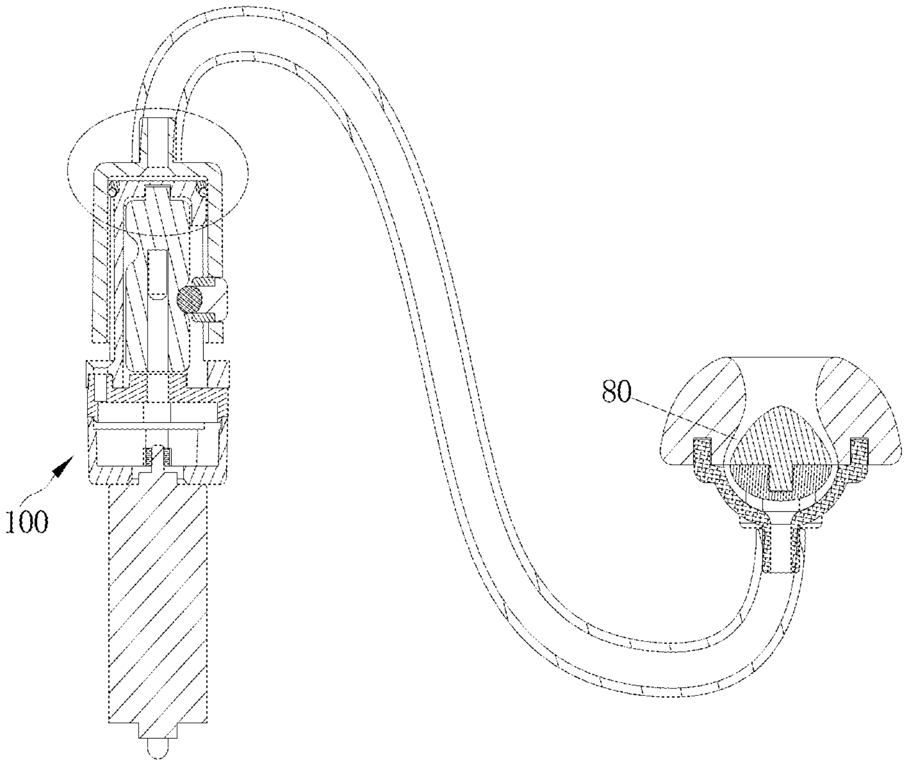
FIG. 2 is a sectional view of the first embodiment of the present application.
Figure 3:
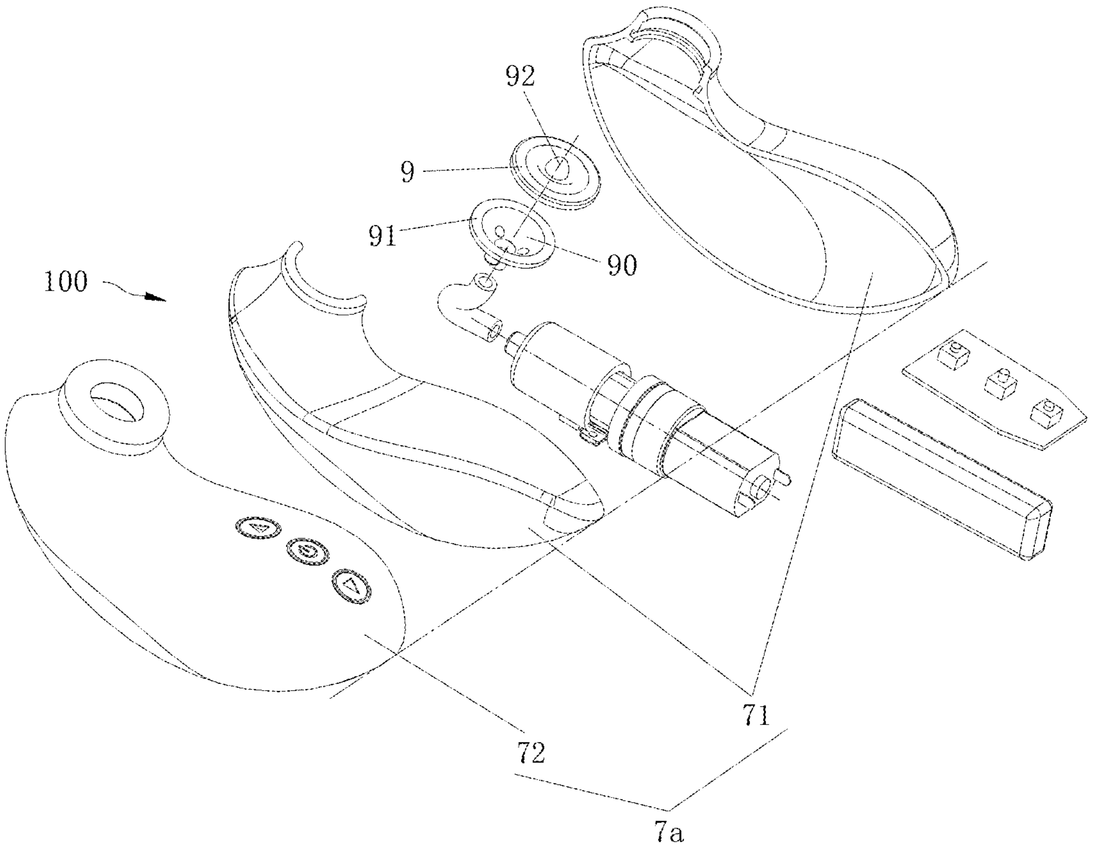
FIG. 3 is an exploded view of a second embodiment of the present application.
Figure 4:
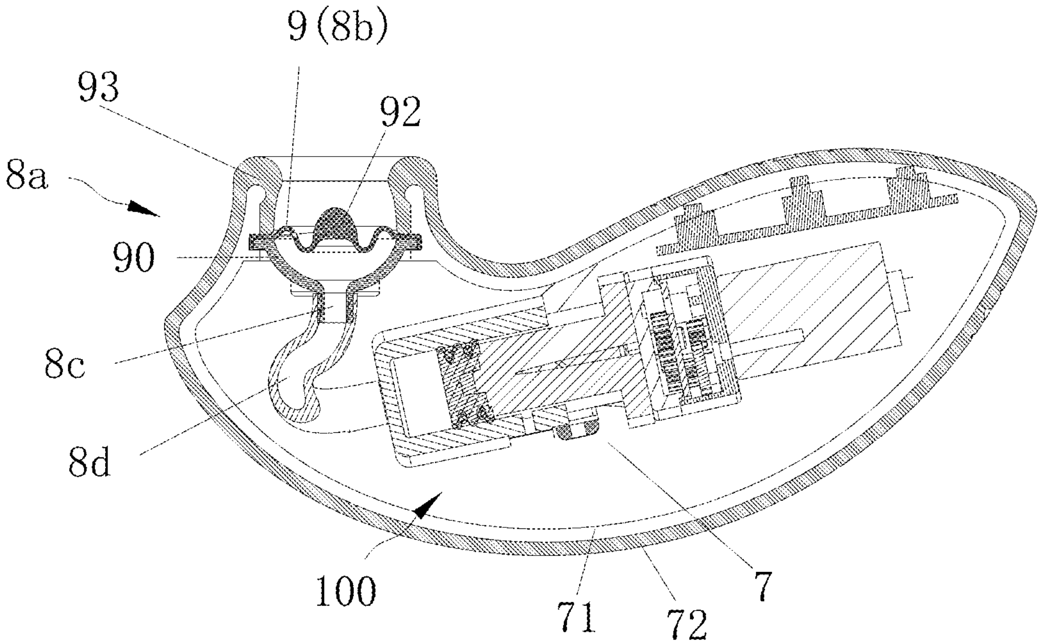
FIG. 4 is a sectional view of the second embodiment of the present application.
Figure 5:
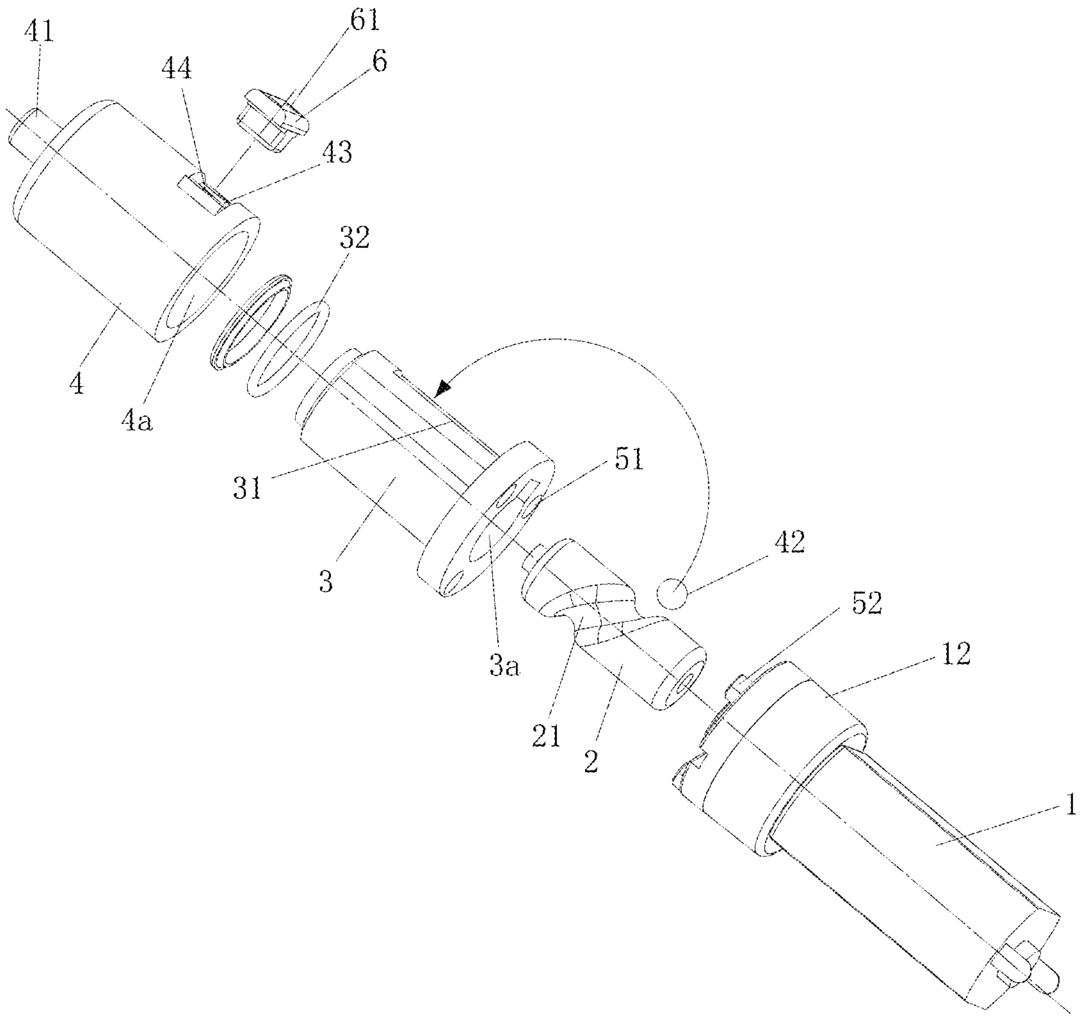
FIG. 5 is an exploded view of a driving apparatus.
Figure 6:
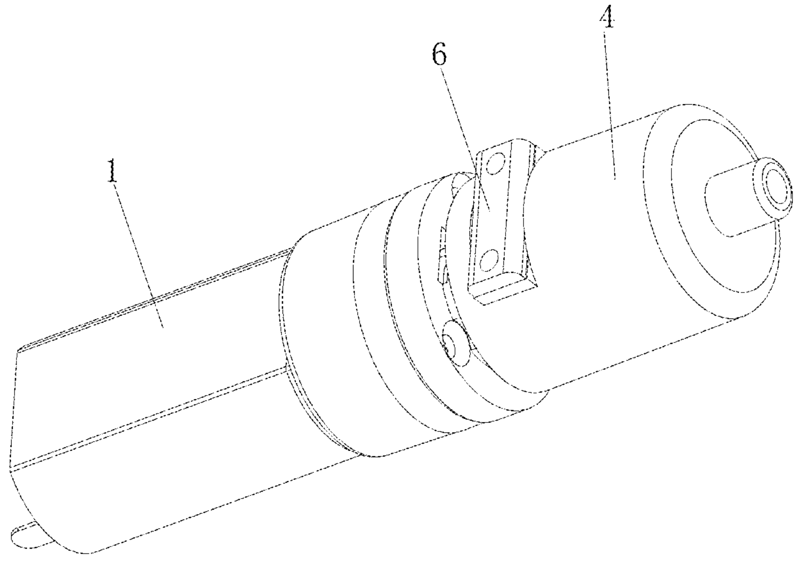
FIG. 6 is a stereoscopic schematic diagram of the driving apparatus.
Figure 7:
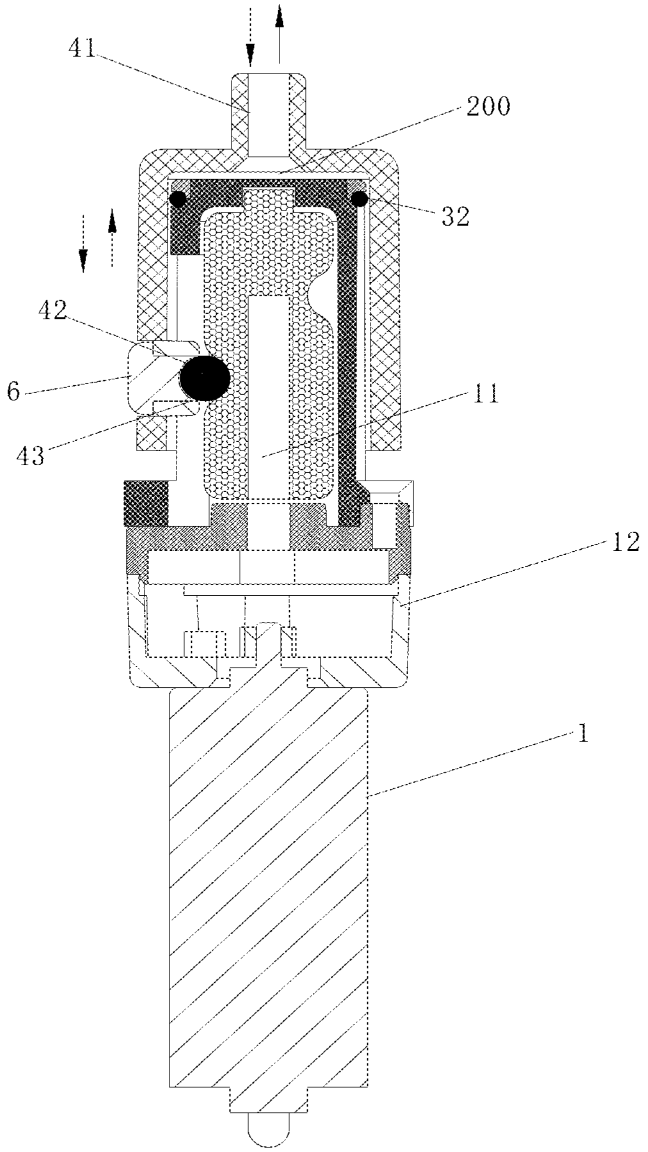
FIG. 7 is a sectional view of the driving apparatus.

As shown in FIGS. 1 to 7, a massager with a non-contact driving apparatus includes:

a machine housing 7*a*, herein the machine housing 7*a* includes a hard inner housing 71 and a soft outer housing 72 that wraps the hard inner housing 71, and the hard inner housing 71 is provided with an accommodating chamber 7;

a driving apparatus 100, herein the driving apparatus 100 is arranged in the accommodating chamber 7, and the driving apparatus 100 includes a rotating motor 1, a driving seat 2, a screw guide seat 3, and an expansion seat 4, a driving end of the rotating motor 1 is provided with a rotating shaft 11 extended upwards, and the driving seat 2 is connected with the rotating shaft 11, an outer wall of the driving seat 2 is provided with a loop-closed spiral groove 21, and the screw guide seat 3 is mounted on an upper wall of the rotating motor 1, the screw guide seat 3 is provided with a positioning cavity 3*a*, the driving seat 2 is arranged in the positioning cavity 3*a*, the screw guide seat 3 is provided with a guide groove 31, an upper end wall of the screw guide seat 3 is provided with a sealing ring 32, an inner wall of the expansion seat 4 is provided with a sliding guide cavity 4*a*, and the sliding guide cavity 4*a* is in contact with the sealing ring 32 and enclosed as a closed cavity 200, the expansion seat 4 is provided with a steel ball 42 that passes through the guide groove 31 and is partially stuck in the spiral groove 21, and an upper portion of the expansion seat 4 is provided with a fluid through hole 41 communicated with the closed cavity 200; and a positioning seat 8*a*, herein the positioning seat 8*a* is provided with a fluid inlet 8*c* communicated with the fluid through hole 41, and the positioning seat 8*a* is provided with a soft piece 8*b*, the expansion seat 4 moves back and forth in the closed cavity 200 and conveys positive and negative pressure fluid, thereby the soft piece 8*b* is forced to swing back and forth.

In a practical design, by improving the structure of the driving apparatus 100, linear variation of fluid is achieved, and movement intermittency caused by an existing cam mechanism is avoided, so that the movement of the soft piece is softer. At the same time, a non-contact driving mode is adopted to achieve non-contact driving of the soft piece.

Firstly, the driving seat 2 is mounted in the position of the rotating shaft 11, then the screw guide seat 3 is fixed on the rotating motor 1, the expansion seat 4 is mounted on the screw guide seat 3, and finally the steel ball 42 is mounted on the expansion seat 4, the steel ball 42 is allowed to pass through the guide groove 31 and stuck in the spiral groove 21; and when the rotating motor 1 rotates, the steel ball 42 rotates with the spiral groove 21 and forces the expansion seat 4 to move vertically back and forth along a height direction of the guide groove 31, namely the expansion seat 4 achieves up and down movement of the expansion seat 4 by the loop-closed spiral groove 21. At the same time, by the reciprocating movement of the expansion seat 4 in the closed cavity 200, the pressure change of the fluid through hole 41 is achieved, and the air pressure change is more linear, and the stability is better.

For example, when the rotating motor 1 rotates clockwise, the expansion seat 4 achieves relative air intake; when the rotating motor 1 rotates counterclockwise, the expansion seat 4 achieves relative air supply; and thus, the positive and negative air pressure switching of the closed cavity 200 is achieved, and the air flow is uniform and stable, the air pressure is stronger, thereby it is guaranteed that an air pump achieves the corresponding function.

Specifically, a driving end of the rotating motor is connected with a gearbox 12, as to deliver a more stable torque, thereby linear sliding of the expansion seat 4 is guaranteed, and linear switching of positive and negative air pressures is achieved.

Specifically, an upper wall of the rotating motor is provided with positioning columns 51 arranged at intervals, and the screw guide seat 3 is provided with a positioning hole 52 matched with the positioning seat 8*a*, thereby the mounting and fixing of the screw guide seat 3 are achieved.

Specifically, the spiral groove 21 is composed of two arc-shaped grooves 211 arranged symmetrically and obliquely; and the depth of the spiral groove 21 is greater than a half of the diameter of the steel ball 42, thereby the vertical movement of the expansion seat 4 driven by the steel ball 42 is achieved.

Specifically, the expansion seat 4 is provided with a clamping hole 43, two sides of the clamping hole 43 are provided with a screw hole 44, the steel ball 42 is arranged in a position in which there is the screw hole 44, the clamping hole 43 is provided with an outer cover 6 that wraps the steel ball 42 inside it, and the outer cover 6 is provided with a via hole 61 matched with the screw hole 44, thereby the convenient mounting of the steel ball is achieved.

In a first embodiment, the positioning seat 8*a* includes a hard bottom seat 81 mounted on the hard inner housing 71 and a soft top seat 82 mounted on the hard bottom seat 81, the hard bottom seat 81 and the soft top seat 82 are enclosed as a sliding groove 80.

The soft piece is a flowing guide ball 8, the fluid inlet 8*c* is arranged in the hard bottom seat 81, the flowing guide ball 8 may move relatively along the sliding groove 80 and switch between a closed position and an opened position of the fluid inlet 8*c*. The soft top seat 82 is matched with the flowing guide ball 8 of the soft piece, herein the soft top seat 82 is used to imitate a mouth of a human body, and the flowing guide ball 8 is used to imitate a tongue of the human body. When the air pressure is changed and drives the flowing guide ball 8 to move, a guide structure may also be arranged between the flowing guide ball 8 and the hard bottom seat 81, as to achieve reciprocating movement in a predetermined direction (while blowing and inhaling are satisfied).

Specifically, the flowing guide ball 8 is elliptical in shape with a diameter expanded gradually from top to bottom, and the fluid inlet 8*c* and the fluid through hole 41 are connected by a guide tube 8*d*, which not only satisfies the closure of the fluid inlet 8*c* but also imitate the tongue of the human body.

In a second embodiment, the soft piece 8*b* is an elastic film 9, the positioning seat 8*a* is a hard arc-shaped seat 91 of which an upper end is provided with an opening, the elastic film 9 wraps the opening and is enclosed as a vibrating cavity 90, the fluid inlet 8*c* is arranged in the hard arc-shaped seat 91, the fluid inlet 8*c* and the fluid through hole 41 are connected by the guide tube 8*d*, and when the positive and negative pressure fluid is conveyed to the vibrating cavity 90, it may force the elastic film 9 to vibrate and make a predetermined stroke.

Herein the elastic film 9 may have a certain degree of elasticity. When the fluid is negative, the elastic film 9 is deformed inwards, and when the fluid is positive, the elastic film 9 may be deformed upwards or be reset by the elastic deformation of the elastic film 9, thereby reciprocating vibration of the elastic film 9 is achieved; and certainly, the movement direction of the elastic film 9 may also be set oppositely, and the same technical effect may also be achieved.

Specifically, a middle portion of the elastic film 9 is protruded upwards and provided with a tongue portion 92, thereby the tongue of the human body is imitated; and the elastic film 9 is circular in shape, and a wall surface of the elastic film 9 has a concave-convex arc, thereby the stroke direction limit of the elastic film 9 is achieved.

Specifically, the soft outer housing 72 extends upwards and is arranged on the periphery of the hard arc-shaped seat 91 to form an enclosure portion 93, herein the enclosure portion 93 is used to imitate the mouth of the human body.

Herein this design converts the axial rotation of the rotating motor 1 into the reciprocating linear movement of the expansion seat 4, thereby the changes of the air pressure are achieved (it may be understood as blowing or inhaling).

The above are only preferred embodiments of the present application and do not limit the patent scope of the present application. Any equivalent structural changes made by using the contents of the description and drawings of the present application, under the inventive concept of the present application or directly/indirectly applied in other related technical fields, are all included in the scope of patent protection of the present application.

What is claimed is:

1. A massager with a non-contact driving apparatus, comprising a driving apparatus and a positioning seat, wherein:

the driving apparatus comprises a rotating motor, a driving seat, a screw guide seat, and an expansion seat;

a driving end of the rotating motor is provided with a rotating shaft extended upwards, and the driving seat is connected with the rotating shaft;

an outer wall of the driving seat is provided with a loop closure-shaped spiral groove, and the screw guide seat is mounted on an upper wall of the rotating motor;

the screw guide seat is provided with a positioning cavity, the driving seat is arranged in the positioning cavity, the screw guide seat is provided with a guide groove, an upper end wall of the screw guide seat is provided with a sealing ring, an inner wall of the expansion seat is provided with a sliding guide cavity, and the sliding guide cavity is in contact with the sealing ring and enclosed as a closed cavity;

the expansion seat is provided with a steel ball that passes through the guide groove and is partially stuck in the spiral groove, and an upper portion of the expansion seat is provided with a fluid through hole communicated with the closed cavity;

the positioning seat is provided with a fluid inlet communicated with the fluid through hole, and the positioning seat is provided with a soft piece; and the expansion seat moves back and forth in the closed cavity and conveying positive and negative pressure fluid, thereby forcing the soft piece to move or deform.

2. The massager with the non-contact driving apparatus according to claim 1, further comprising a machine housing, wherein the machine housing comprises a hard inner housing and a soft outer housing that wraps the hard inner housing, the hard inner housing is provided with an accommodating chamber, and the driving apparatus is arranged in the accommodating chamber; and a driving end of the rotating motor is connected with a gearbox.

3. The massager with the non-contact driving apparatus according to claim 1, wherein the upper wall of the rotating motor is provided with positioning columns arranged at intervals, and the screw guide seat is provided with a positioning hole matched with the positioning seat.

4. The massager with the non-contact driving apparatus according to claim 1, wherein:

the spiral groove is composed of two arc-shaped grooves arranged symmetrically and obliquely; and a depth of the spiral groove is greater than a half of a diameter of the steel ball.

5. The massager with the non-contact driving apparatus according to claim 1, wherein the expansion seat is provided with a clamping hole, two sides of the clamping hole are provided with a screw hole, the steel ball is arranged in a position in which there is the screw hole, the clamping hole is provided with an outer cover that wraps the steel ball inside it, and the outer cover is provided with a through hole matched with the screw hole.

6. The massager with the non-contact driving apparatus according to claim 1, wherein:

the positioning seat comprises a hard bottom seat mounted on the hard inner housing and a soft top seat mounted on the hard bottom seat, the hard bottom seat and the soft top seat are enclosed as a sliding groove; and the soft piece is a flowing guide ball, the fluid inlet is arranged in the hard bottom seat, the flowing guide ball can move relatively along the sliding groove and switch between a closed position and an opened position of the fluid inlet.

7. The massager with the non-contact driving apparatus according to claim 6, wherein the flowing guide ball is elliptical in shape with a diameter expanded gradually from top to bottom, and the fluid inlet and the fluid through hole are connected by a guide tube.

8. The massager with the non-contact driving apparatus according to claim 1, wherein the soft piece is an elastic film, the positioning seat is a hard arc-shaped seat of which an upper end is provided with an opening, the elastic film wraps the opening and is enclosed as a vibrating cavity, the fluid inlet is arranged in the hard arc-shaped seat, the fluid inlet and the fluid through hole are connected by a guide tube, and when the positive and negative pressure fluid is conveyed to the vibrating cavity, the elastic film is forced to vibrate and make a predetermined stroke.

9. The massager with the non-contact driving apparatus according to claim 8, wherein a middle portion of the elastic film is protruded upwards and provided with a tongue portion, the elastic film is circular in shape, and a wall surface of the elastic film is both concave and convex.

10. The massager with the non-contact driving apparatus according to claim 8, wherein a soft outer housing extends upwards and is arranged on a periphery of the hard arc-shaped seat to form an enclosure portion.

* * * * *